United States Patent
Feldman et al.

(10) Patent No.: US 10,616,633 B2
(45) Date of Patent: Apr. 7, 2020

(54) SYSTEM FOR CONNECTING A MOBILE DEVICE AND A COMMON DISPLAY

(71) Applicant: T1V, INC., Charlotte, NC (US)

(72) Inventors: Michael R. Feldman, Huntersville, NC (US); James E. Morris, Lake Wylie, SC (US)

(73) Assignee: T1V, INC., Charlotte, NC (US)

( * ) Notice: Subject to any disclaimer, the term of this patent is extended or adjusted under 35 U.S.C. 154(b) by 456 days.

(21) Appl. No.: 15/056,787

(22) Filed: Feb. 29, 2016

(65) Prior Publication Data
US 2017/0251238 A1 Aug. 31, 2017

(51) Int. Cl.
*H04N 21/41* (2011.01)
*H04N 21/436* (2011.01)
*H04N 21/431* (2011.01)
*H04N 21/4402* (2011.01)
*H04N 21/414* (2011.01)
(Continued)

(52) U.S. Cl.
CPC ....... *H04N 21/4126* (2013.01); *G06F 3/1454* (2013.01); *G09G 5/14* (2013.01); *H04N 21/2187* (2013.01); *H04N 21/4122* (2013.01); *H04N 21/41407* (2013.01); *H04N 21/436* (2013.01); *H04N 21/4312* (2013.01); *H04N 21/4316* (2013.01); *H04N 21/4356* (2013.01); *H04N 21/4402* (2013.01); *H04N 21/440263* (2013.01); *H04N 21/6373* (2013.01); *H04N 21/8166* (2013.01); *G06F 3/1446* (2013.01); *G09G 2340/0407* (2013.01); *G09G 2340/0464* (2013.01); *G09G 2352/00* (2013.01); *G09G 2360/04* (2013.01); *G09G 2370/022* (2013.01); *G09G 2370/042* (2013.01); *G09G 2370/06* (2013.01); *G09G 2370/16* (2013.01)

(58) Field of Classification Search
CPC .......... H04N 21/4126; H04N 21/2187; H04N 21/4122; H04N 21/41407; H04N 21/4312; H04N 21/4316; H04N 21/4356; H04N 21/436; H04N 21/4402; H04N 21/440263; H04N 21/4882; H04N 21/8166
See application file for complete search history.

(56) References Cited

U.S. PATENT DOCUMENTS 7,242,389 B1 * 7/2007 Stern ...................... G06Q 10/10
                                                              345/158
8,918,822 B2    12/2014 Vargolu et al.
(Continued)

OTHER PUBLICATIONS

International Search Report dated Feb. 2, 2018 for PCT/US2017/064525, co-pending U.S. Appl. No. 16/431,433.
(Continued)

*Primary Examiner* — Stella Higgs
(74) *Attorney, Agent, or Firm* — Xsensus LLP

(57) ABSTRACT

A method of connecting a mobile device to a common display associated with a display computer controlling the common display, including, for each mobile device downloading a display application onto the mobile device, selecting the display computer for the common display in the display application, connecting the mobile device to the display computer, selecting, on the mobile device, what is to be displayed on the common display, and sending a data stream of the selection to the display computer to be displayed in a window on the common display corresponding to the mobile device.

17 Claims, 10 Drawing Sheets

(51) Int. Cl.
  *G09G 5/14* (2006.01)
  *H04N 21/6373* (2011.01)
  *G06F 3/14* (2006.01)
  *H04N 21/2187* (2011.01)
  *H04N 21/435* (2011.01)
  *H04N 21/81* (2011.01)

(56) References Cited

U.S. PATENT DOCUMENTS

| | | | | |
|---|---|---|---|---|
| 9,253,229 B1* | 2/2016 | Strothmann | | H04N 21/2662 |
| 2003/0222915 A1* | 12/2003 | Marion | | G06F 3/0486 |
| | | | | 715/769 |
| 2005/0066089 A1* | 3/2005 | Karaoguz | | H04N 21/4316 |
| | | | | 710/72 |
| 2006/0037053 A1* | 2/2006 | McDowell | | H04N 7/18 |
| | | | | 725/80 |
| 2009/0235170 A1* | 9/2009 | Golden | | G06F 3/14 |
| | | | | 715/719 |
| 2010/0082784 A1* | 4/2010 | Rosenblatt | | H04L 12/2812 |
| | | | | 709/222 |
| 2010/0115554 A1* | 5/2010 | Drouet | | H04N 5/44543 |
| | | | | 725/41 |
| 2011/0283334 A1* | 11/2011 | Choi | | G06F 3/04883 |
| | | | | 725/148 |
| 2012/0108215 A1* | 5/2012 | Kameli | | H04M 1/0256 |
| | | | | 455/412.2 |
| 2012/0178368 A1 | 7/2012 | Fleck et al. | | |
| 2012/0272149 A1* | 10/2012 | Lee | | H04L 65/4084 |
| | | | | 715/716 |
| 2013/0103446 A1* | 4/2013 | Bragdon | | G06Q 10/1095 |
| | | | | 705/7.15 |
| 2014/0240445 A1 | 8/2014 | Jaynes | | |
| 2015/0002369 A1 | 1/2015 | Araki | | |
| 2015/0095822 A1 | 4/2015 | Feis et al. | | |
| 2015/0200985 A1 | 7/2015 | Feldman et al. | | |
| 2015/0249613 A1* | 9/2015 | Robbins | | H04N 21/4122 |
| | | | | 709/226 |
| 2015/0326915 A1 | 11/2015 | Jaynes et al. | | |
| 2015/0341570 A1 | 11/2015 | Jaynes | | |
| 2015/0350737 A1 | 12/2015 | Anderson et al. | | |
| 2016/0119388 A1 | 4/2016 | Sitrick et al. | | |

OTHER PUBLICATIONS

Extended European Search Report dated Jul. 29, 2019 for related European application EP 1 776 061.0.

* cited by examiner

SYSTEM FOR CONNECTING A MOBILE DEVICE AND A COMMON DISPLAY

SUMMARY

One or more embodiments are directed to a method of connecting a mobile device to a common display having associated with a display computer controlling the common display, including, for each mobile device downloading a display application onto the mobile device, selecting the display computer for the common display in the display application, connecting the mobile device to the display computer, selecting, on the mobile device, what is to be displayed on the common display; and sending a data stream of the selection to the display computer to be displayed in a window on the common display corresponding to the mobile device. The display computer is to determine a first resolution (R1) of the data stream sent by the mobile device to the display computer, determine a region in which the data stream is to be presented and a second resolution (R2) associated therewith, and when R2 is less than R1, then sending a third resolution (R3) to the device, where R1>R3>=R2, and the display application on the mobile device is to down sample the selection in accordance with the resolution, R3, and only transmitting the down sampled resolution (R3) to the display computer.

An entirety of the mobile display may be selected to be sent to the common display and the region may be a window with an R2 less than R1. An entirety of the mobile display may be selected to be sent to the common display and the region may be a window with R1. The region may be a tray region outside a display region of the common display where windows are displayed.

An entirety of the mobile display may be selected to be sent to the common display and the region is a window, the common display is a touch screen display and the user may select only a portion of the window to be displayed by performing a touch tap or gesture on the common display.

An entirety of the mobile display may be selected to be sent to the common display and the region is may be a window on a touchscreen display, separate from the common display, the user may select only a portion of the window on the touchscreen display to be displayed on the common display.

Selecting what is to be displayed on the common display may include selecting only a portion of a screen on the mobile device.

The window may be an editable window can be moved, resized, and marked on.

When a user modifies a file on the common display and then performs a predetermined action on the common display involving the selection of one of the mobile devices, the modified file may be transmitted to the corresponding mobile device.

The method may include automatically displaying the selection in the window.

The method may include displaying a device icon in a tray region outside a display region of the common display where windows are displayed.

The method may include displaying the selection in the window when the device icon is moved toward the display region on the common display.

When the window is moved toward the device icon, the display computer may transmit the file represented in the window to the corresponding device.

The method may include receiving a warning signal from the display computer when the device is more than a predetermined distance from the display computer to which it is connected.

Selecting may include selecting from a list of display computers on the mobile device.

Selecting the display computer may include inputting a machine identifier of the display computer.

Selecting may include automatically connecting to the common display closest to the device.

One or more embodiments are directed a method of connecting a mobile device to a common display associated with a display computer controlling the common display, including, for each mobile device: downloading a display application onto the mobile device, selecting the display computer for the common display in the display application, connecting the mobile device to the display computer, selecting, on the mobile device, only a portion of the mobile device to be displayed on the common display; and sending a live continuous video stream of the selection to the display computer to be displayed in a window on the common display corresponding to the mobile device, the window for the portion of the mobile device occupying a display region of the common display.

The method may include connecting another mobile device to the common display and selecting, on the other mobile device, only a portion of the mobile device to be displayed on the common display, wherein windows for the mobile device and the other mobile device occupy the display region of the common display.

The method may include determining, by the display computer, a size of the window and a resolution associated therewith, sending the resolution to the device, and down sampling the selection in accordance with the resolution and only transmitting the down sampled resolution to the display computer.

One or more embodiments are directed a method of connecting a mobile device to a common display associated with a display computer controlling the common display, including, for each mobile device: downloading a display application onto the mobile device, detecting a signal associated with display computers indicative of a location of the display computers, selecting the display computer for the common display in the display application based on a closest display computer to the mobile device, connecting the mobile device to the display computer, selecting, on the mobile device, what is to be displayed on the common display, and sending a live continuous video stream of the selection to the display computer to be displayed in a window on the common display corresponding to the mobile device.

The method may include automatically determining, selecting, and connecting to the common display closest to the device.

The signal may be from a beacon associated with the display computer.

Selecting may include showing a list of the display computers in the mobile device with the closest display computer being listed first.

One or more embodiments are directed a method of connecting a mobile device to a common display having a discernible machine identifier associated with a display computer controlling the common display, including downloading a display application onto the mobile device, selecting the display computer for the common display in the display application, connecting the mobile device to the display computer, selecting, on the mobile device, what is to be displayed on the common display, sending a live continuous video stream of the selection to the display computer to be displayed in a window on the common display corresponding to the mobile device, and sending a warning signal from the display computer to the mobile device when the mobile device is more than a predetermined distance from the display computer to which it is connected.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
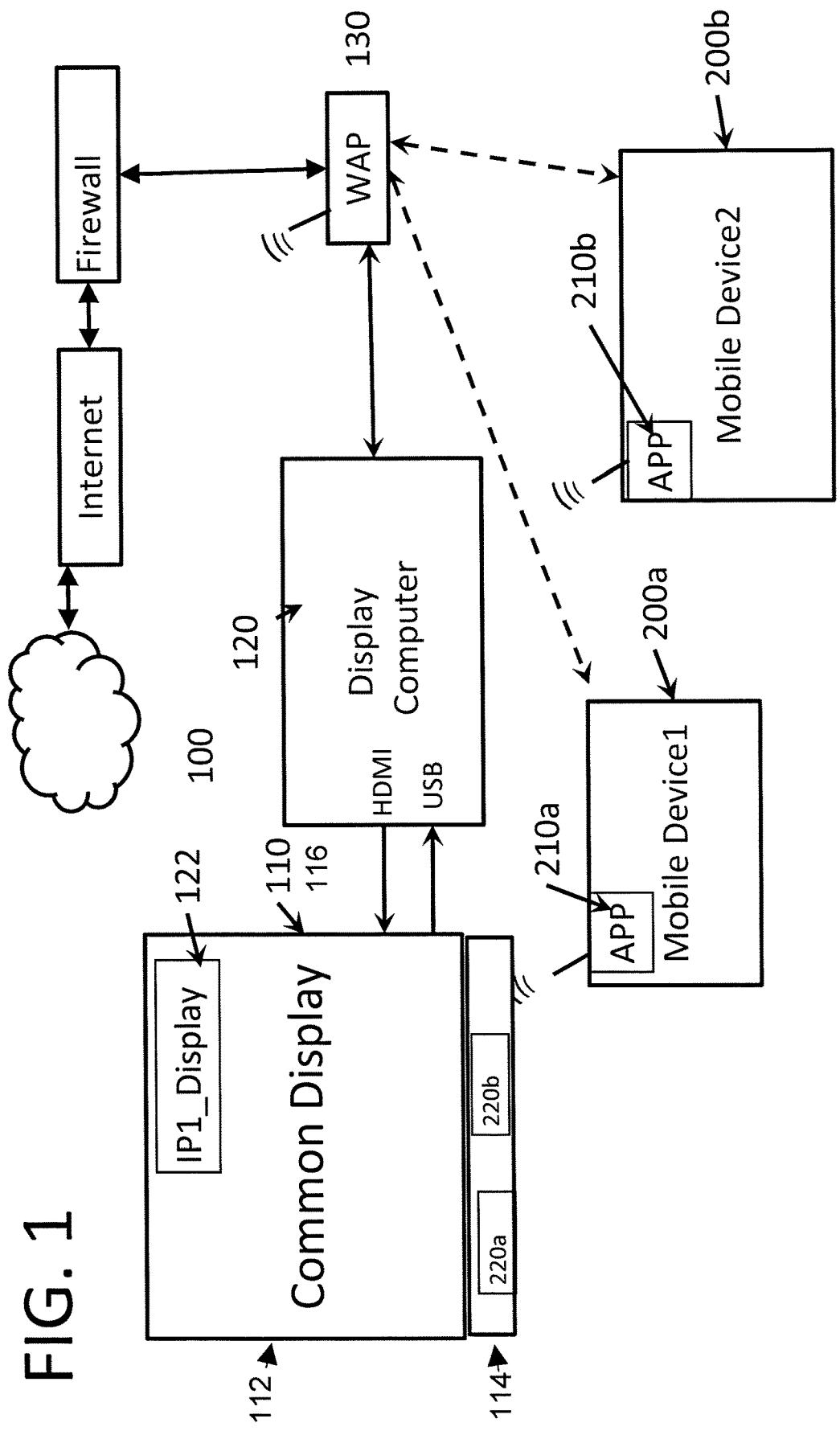
FIG. 1 illustrate a block diagram of a display system in accordance with an embodiment.

FIG. 1 illustrates a block diagram of a display system 100 interacting with one or more mobile devices 200a, 200b, and so forth. The display system 100 includes a Common Display 110, a Display Computer 120, and a wireless router 130 serving as a wireless access point (WAP), all interconnected. The Common Display 110 may be an LCD display, LED display, or other monitor that is capable of having an electronic video signal as an input and converting the input to a visual image.

The Common Display 110 may include a display region 112 and a tray region 114, e.g., below the display region. The Common Display 110 a touch sensor 116, e.g., overlaying an entirety of the Common Display 110, that it is sensitive to touch inputs including taps and gestures.

Information regarding a Machine Identifier 122 of the Display Computer 120 and the digital information to be displayed on the Common Display 110 may be sent from the Display Computer 120 to the Common Display 110. This digital information can be within windows or Mobile Device Windows (MDWs), e.g., editable windows, or on the entire screen of display region 112 of the Common Display 110. In addition, there may be windows displaying contents from mobile devices (MD) or other appropriate mobile device icons (MDI) 220a, 220b, e.g., a thumbnail of what is displayed on the mobile device, in the tray region 114 on the Common Display 110, e.g., at a lower region thereof. The tray region 114 may be a region on which the MDWs cannot be zoomed and pinched, annotated, and so forth, but may be dragged, tapped or tossed onto the display region 112, e.g., to open an MDW corresponding to the MDI, and/or to received MDWs from the display region 112 to transmit that MDW to the mobile device corresponding to the MDI.

Digital information from Mobile Device1 (200a) and Mobile Device2 (200b) is streamed from these Mobile Devices to the Display Computer 120 through the network. In FIG. 1, digital information is streamed from the mobile devices through the WAP 130 to the Display Computer 120. This streaming data may then be displayed in the Mobile Device Windows (MDW) (see FIGS. 4 to 9) on the Common Display 110.

Typically, the data streamed from the Mobile Device (200a and/or 200b) is a video signal that is the same as the signal displayed on the Mobile Device. This streaming data will be referred to as a Mobile Devices Data Stream (MDDS). A MDDS is typically displayed within a MDW (see associated screens in FIGS. 6 to 9) in the display region 112 on the Common Display 110. Within or adjacent this MDQ, there may also be displayed an identifier associated with the Mobile Device, e.g., the name of the MDDS, a name associated with the corresponding Mobile Device, the Mobile Device's owner, and so forth.

If the mobile device 200a is running a Mac® operating system or an Iphone® operation system (iOS), then the user can use Airplay® to locate the Display Computer 120 that is configured as an Airplay® receiver. Airplay® is a video mirroring capability built in to Mac® OS and iOS. Using Airplay® to locate Airplay® receivers, the user can then view any devices on the network that are configured to receive Airplay® inputs, typically just Apple TV®s.

However, in accordance with an embodiment, the display computer 120 may include and run software, firmware, and/or hardware that acts as a video mirroring receiver. Then, when a user gets on the wireless network and searches for Airplay® receivers, the name of the display computer 120 will appear as an option to stream video within Airplay®. Once connected, the entire contents of the mobile device 200a may be streamed to the display computer 120.

However, Airplay® employs a Bonjour® network protocol. Some companies block Bonjour® protocol. Further, Bonjour® broadcasts will not travel across sub-networks. Finally, if the mobile device is using an operating system other than Mac® or iOS, Airplay® is not an option.

Therefore, in accordance with an embodiment, a user of a mobile device may download a display application 210a, 210b thereon to assist in connecting the to the display computer 120. Such an application may be written for each common operating system and is herein referred to as an AirConnect™ App. Instructions for downloading the AirConnect™ App may be readily viewable, e.g., on or adjacent the common display 110, or a region to be scanned, e.g., a bar code, quick response (QR) code, and so forth, using a mobile device QR, so that once scanned, the AirConnect™ App could be downloaded. Once the AirConnect™ App is downloaded, then a user can launch the AirConnect™ App and then enter the Machine Identifier 122 associated common display 110. The Machine Identifier 122 may by an IP address or other alphanumeric code associated with the Display Computer 120. The Machine Identifier 122 may be simply displayed on the Common Display 110, in which case the user of the AirConnect™ App may simply enter the Machine Identifier 122 when prompted by the AirConnect™ App on their Mobile Device. Alternatively, the Machine Identifier 122 may be automatically transferred to the Mobile Device either by displaying a QR code on the Common Display 110 or by transmitting through bluetooth or wireless communication.

For example, a low energy bluetooth beacon (CD-Beacon) 140 (see FIG. 4), may be placed near the Common Display 110. This CD-Beacon 140 may transmit an identification number, e.g., a unique universal identification number (UUID). The AirConnect™ App can detect this UUID and send this information to a cloud server. The cloud server can store a lookup table with each CD-Beacon and the associated Machine Identifier 122 for each Display Computer 120.

Once the Machine Identifier 122 is entered, the AirConnect™ App may then use the Machine Identifier 122 to connect the Mobile Device directly to the display computer 120.

Figure 2A:
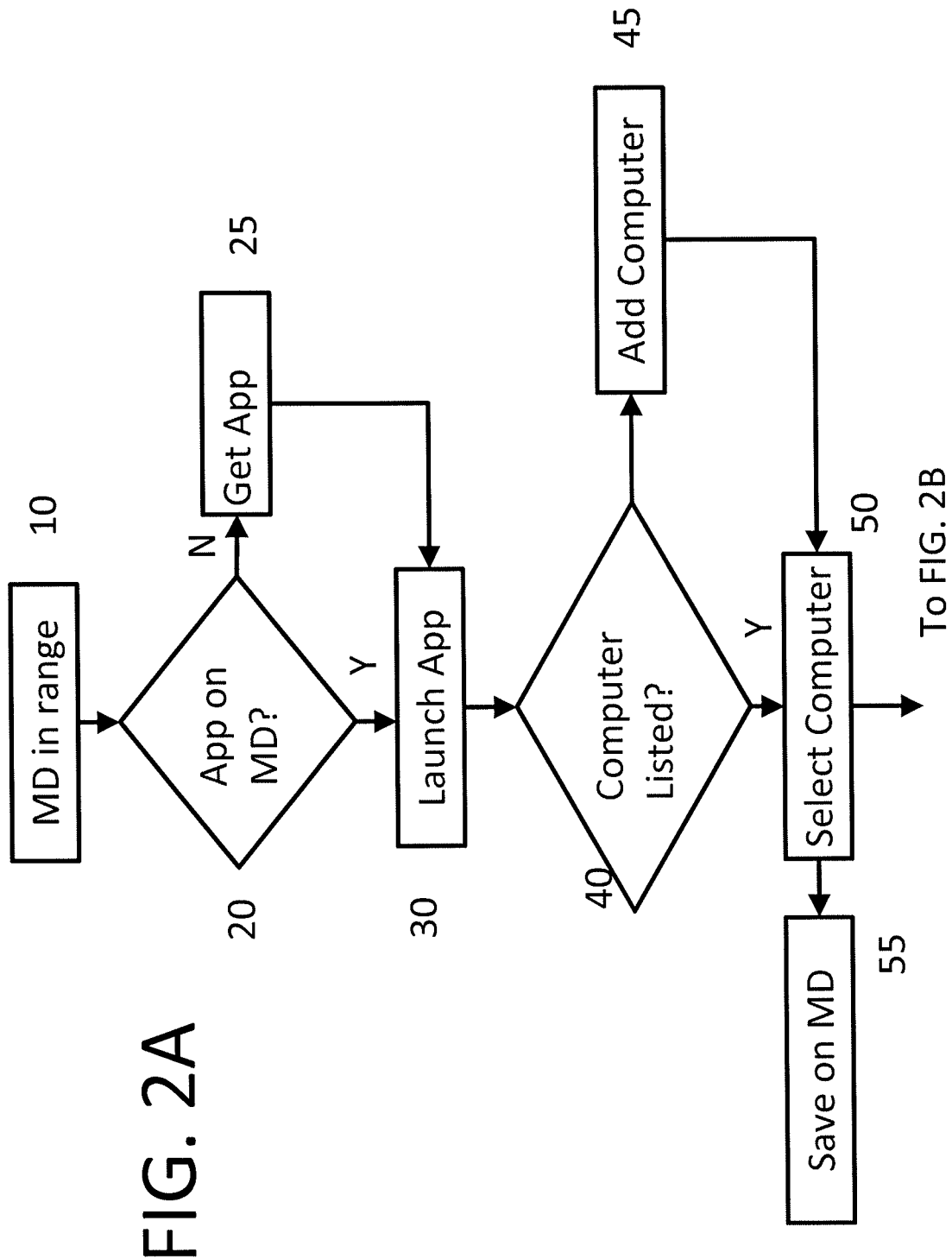
FIGS. 2A and 2B illustrate a flowchart in accordance with an embodiment.
Figure 2B:
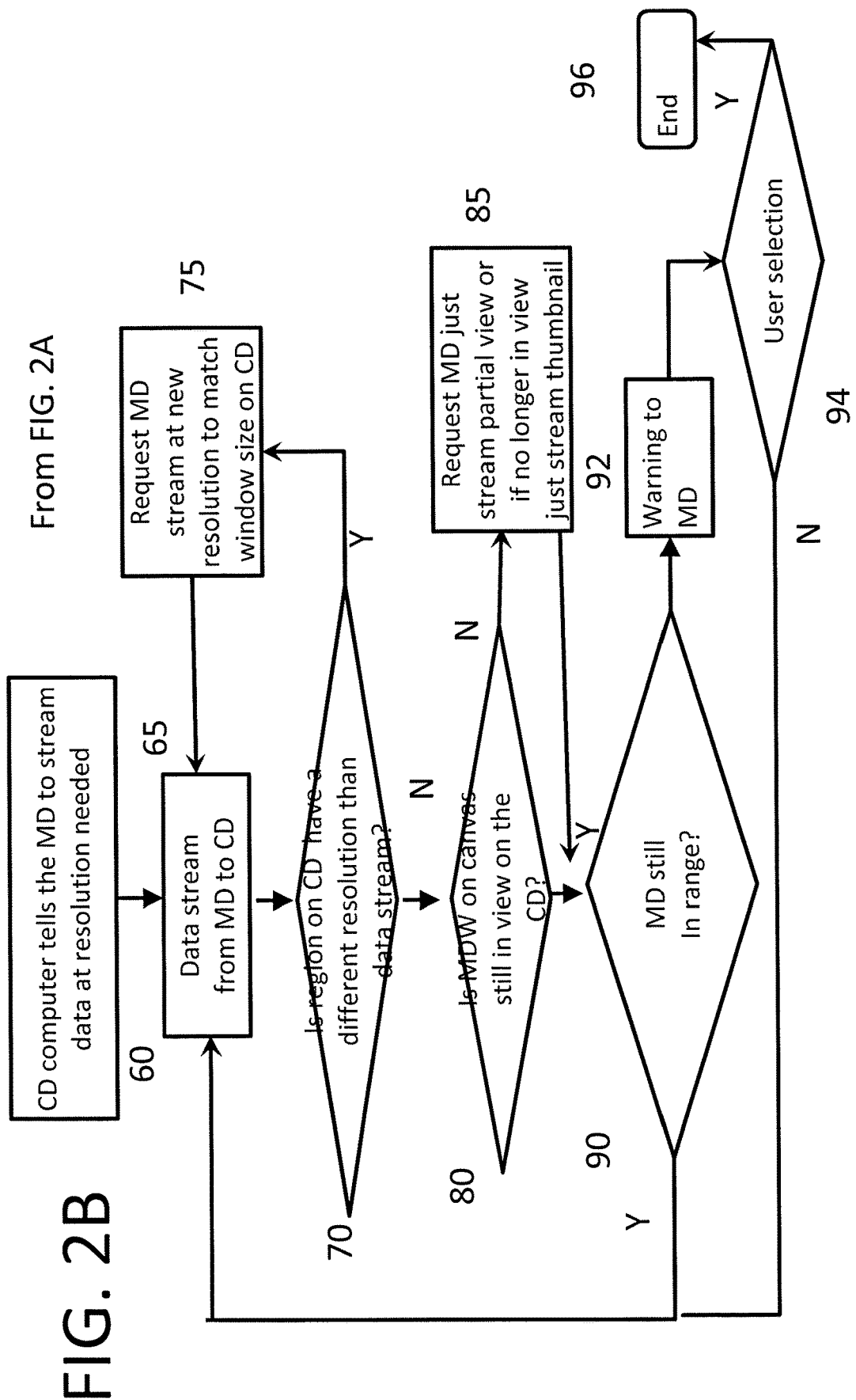

Details of this are illustrated in FIGS. 2A and 2B, which is a flowchart of an operation of connecting Mobile Device(s) to the common display 110 in accordance with an embodiment.

In operation 10, a user walks within range of the display system 100 with a mobile device (MD), connected to a wireless network. If the AirConnect™ App is on the MD in operation 20, the user launches the AirConnect™ App in operation 30 on the MD. If not, then the user may be instructed, e.g., by a notice posted on or near the common display 110, to download the AirConnect™ App on the MD in operation 25, and then to proceed to launch the AirConnect™ App in operation 30.

Once launched, the AirConnect™ App may display a list of locally stored names and/or recently used connections on the mobile device. The Common Display 110 may also display the name or Machine Identifier 122 of the Display Computer 120 that it is connected to and/or the name of the Common Display 110 or Display Computer 120 may be posted near the Common Display 110. If the name associated with the Common Display 110 is not listed in the AirConnect™ App, the user may type a Machine Identifier 122 that may be continuously displayed on or near the common display 110 to add the computer display 120 to the list of FIG. 3 in operation 45. The Machine Identifier 122 may be, e.g., name of the computer (host name), a UUID, and so forth.

Additionally or alternatively, the CD-Beacon 140 method described above may be used to add the computer to the list of computers in operation 45. The AirConnect™ App may capture UUIDs for any beacons within range of the Mobile Device. All of these UUIDs may be transmitted to an AirConnect™ Server and then the AirConnect™ Server may determine if any of these UUIDs are for CD-Beacons. If so, the corresponding Machine Identifiers can then be sent to the AirConnect™ App on the Mobile Device.

Figure 3:
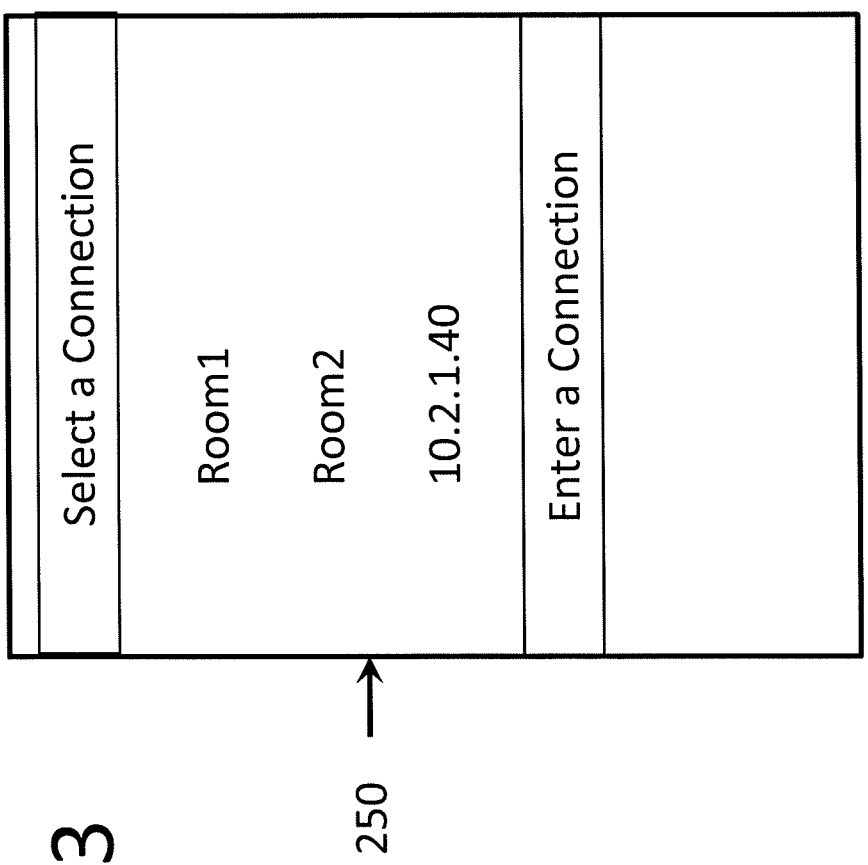
FIG. 3 illustrates an application selection page on a mobile device.

An example of a screen 250 that may appear when using the AirConnect™ App is shown in FIG. 3. Here, a user would be prompted to select which display to be connected with. These options may include a name of a room in which the common display 110 is located, a nickname for the common display that is visually apparent, the machine identifier of the common display that is visually apparent, and so forth. The screen 250 for selection may look the same regardless of the operating system of the mobile device running the AirConnect™ App.

Once the display computer 120 associated with the Common Display 110 is in the list displayed by the AirConnect™ App as shown in FIG. 3, the user of the MD may select a computer in operation 50, and then the AirConnect App can establish a connection between the MD device and the Display Computer, using the Machine Identifier associated with the name of the display computer in the list. Once the connection is established, the display computer 120 may tell the MD what resolution to stream in operation 60, up to a maximum resolution of the MD, and the desired content of the MD may be streamed to the selected computer as discussed below in detail with reference to FIG. 2B.

The Machine Information 122 regarding the selected computer may be saved on the mobile device 200a, 200b in operation 55. For example, if the user then leaves the room and disconnects and then returns, all of the initialization noted above may not need to be repeated.

If the Machine Identifiers 122 are assigned dynamically, there is a good chance that the display computer 120 will have a new Machine Identifier 122 at such a later time. If a computer name or generic name was used, then once the user starts up the AirConnect™ App on the mobile device, a list of computer names or generic names can be displayed in the AirConnect™ App and the user can chose the one to connect to. These names can be either the computers running a common application that are on the same network that is associated with the wireless network that the mobile device is on, or they can be the ones that have been used previously by this mobile device. Further discussion of the common application that allows more than one device to be displayed on the Common Display 110 may be found in U.S. patent application Ser. No. 14/540,946, which is hereby incorporated by reference in its entirety for all purposes. If the Machine Identifier 122 does not change very often, the AirConnect™ App may remember the Machine Identifier 122 in a list.

However, when using generic names and/or computer names, if the Machine Identifier has changed, the AirConnect™ App on the mobile device may not be able to determine the machine identifier of the display computer 120 to send the information thereto. In this case there are several ways to solve this problem. The user can retype in the new Machine Identifier, or a list of names and Machine Identifies can be stored on a server and the Air Connect App can look up the new Machine Identifier on a the server.

Figure 4:
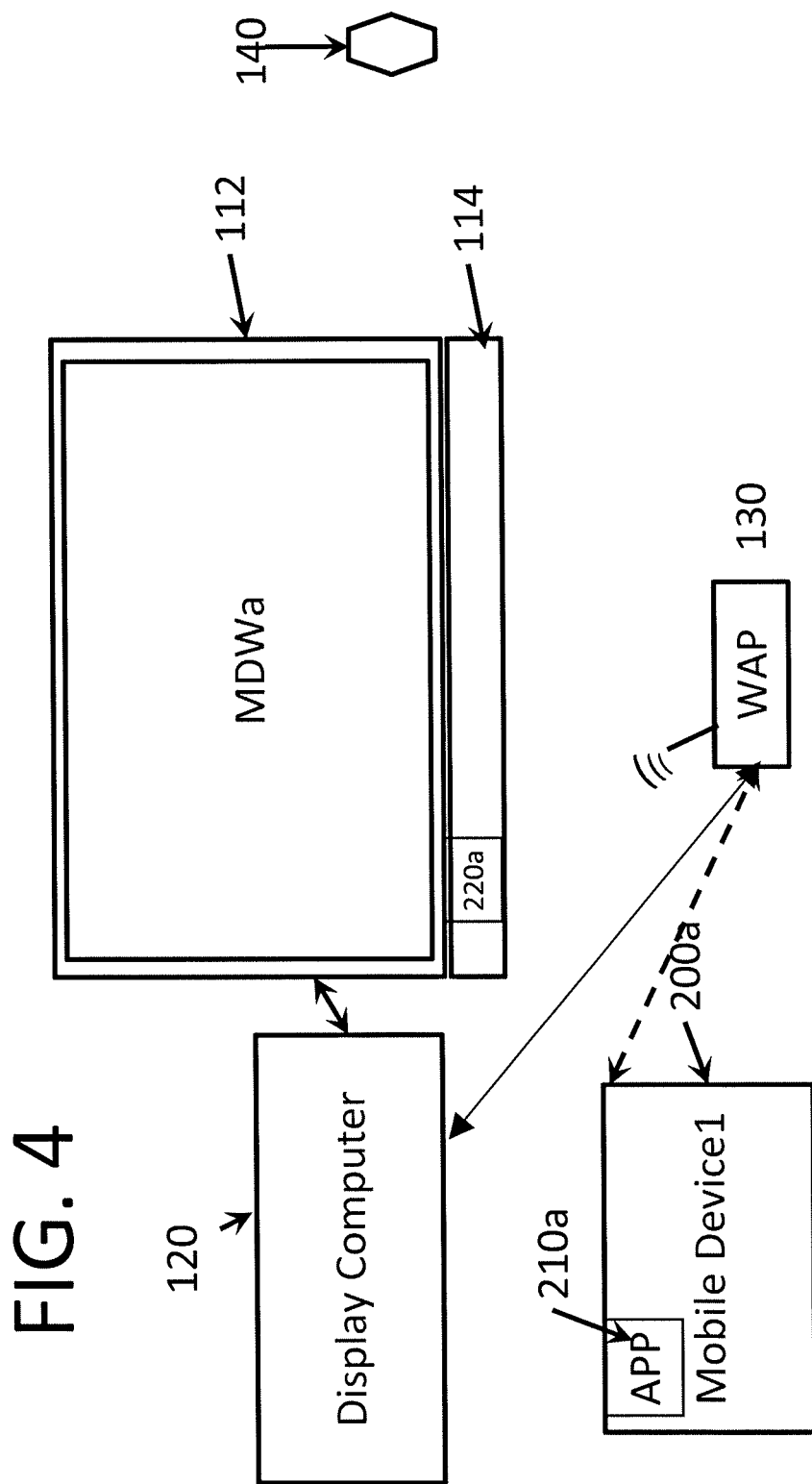
FIG. 4 illustrates a block diagram of a display system including a beacon in accordance with an embodiment.

Another way to solve this problem is to associate a beacon 140 with each display computer 120, as illustrated in FIG. 4. Then when a person walks into a room and starts the AirConnect™ App on a mobile device 200a, 200b, a request can be made to a server (AirConnect™ Connect Server) either in the Cloud (see FIG. 1) or at a predetermined network location. When this request is made, the AirConnect™ App on the mobile device can report information on nearby beacons to the AirConnect™ Server including the UUID for each beacon and the signal strength of each beacon. Based on this information, the AirConnect™ server can determine which display computer 120 is closest to the mobile device 200a.

The AirConnect™ App on the display computer 120 can also report information on nearby beacon(s) 140.

The AirConnect™ server may then automatically connect the mobile device 200a, 200b with the appropriate display computer 120 or can transmit to the AirConnect™ App generic names and/or computer names of all display computers 120 within range and also it can transmit the Machine Identifiers 122 for each of these. The AirConnect™ Server may maintain a list of all display computer 120 names and their associated Machine Identifiers 122 that can be automatically updated. The list can also include generic names, if updated by a user.

Once the AirConnect™ App on the mobile device 200a, 200b has the names of the display computers within range, the AirConnect™ App on the mobile device may list these computer names or generic names on the screen 250 of the mobile device as shown in FIG. 3 and prompt the user to select the display computer to which it wants to connect. Alternatively, GPS information or other Bluetooth protocols can be used to send location information to the cloud server from the application on the display computer 120.

Another option is to have a set-up procedure, whereby CD-Beacons 140 may be registered with associated Common Displays 110 and display computers 120 and approximate GPS locations. The AirConnect™ App, upon initial activation can receive a list of CD-Beacons nearby. The AirConnect™ App may then be in sleep mode and be programmed to wake-up when the mobile device is within a pre-determined range of a CD-Beacon 140, either any CD-Beacon 140, or any one of a list of specific CD-Beacons 140. Upon wake-up, the AirConnect™ App may present a list of potential Common Displays 110 to the user to connect to or may automatically connect the Mobile Device to the Common Display 110 with the CD-Beacon 140 that is closest to the Mobile Device.

Alternatively or additionally, a confirmation screen of the connection may be displayed on the Common Display 110, and the user would tap or perform a gesture near the Common Display 110 to confirm the connection to the mobile device. The gesture may be recognized by an appropriately placed camera associated with the display computer 120.

Once connected, the mobile device(s) 220*a* and the common display 110 may interact in numerous manners, as discussed below with reference to FIG. 2B.

As shown in FIGS. 4 to 9, once a mobile device (MD) is connected to the display computer 120, an icon of this mobile device (Mobile Device Icon or MDI) 220*a*. 220*b*, etc., may be shown on the Common Display 110, e.g., in the tray region 114, and the MD may stream data to the display computer 120, in operation 65, after receiving a resolution request from the display computer 120 in operation 60. The MDI could be either a graphic image or a thumbnail of a small live video stream of the MDDS. The display computer 120 may tell the mobile device MD the resolution of the data stream needed for the MDI, e.g., 160×90, in operation 60. Further, the user of the mobile device MD may stream an entirety of the display on the MD (see FIGS. 4 to 7) or may select only a portion of the display on the mobile display MD (see FIG. 8). Depending on an operational mode of the common display 110, the data stream from the MD may be shown in a tray region 114, e.g., an area of the common display 110 designated for indicating which mobile devices MDs are connected thereto. As shown in FIGS. 4 to 8, the tray region 114 may be in a bottom portion of the common display 110.

In one operational mode (Standard Mode), to move Mobile Device data streams (MDDS) from the tray region 114 to the display region 112 of the Common Display the MDIs can be dragged by a user by a touch gesture on the Common Display touch sensor 116, e.g., a drag from the tray region 114 to the display region 112. Alternative method of dragging the MDIs 220*a*, 220*b*, would include gesture recognition, voice recognition, or other user interface, as discussed below with reference to FIG. 9.

In an alternative operational mode (AutoMode) the MDIs in the tray region 114 could be automatically displayed on the display region 112. When the first MD is connected in AutoMode, the MDDS may occupy a MDW to match the aspect ratio of the MDDS. This MDW may occupy as much of the display region 112 as possible (See FIGS. 4 and 5). The MDW may take up the entire screen if the MDDS is the same aspect ratio as the display region 112 of the Common Display 110. When a second MDDS is connected, each MDW may have a same size and together occupy approximately half of the screen (see FIG. 7). Similarly, when there are four MDWs, each MDW may occupy one quarter of the display region 112 (see FIG. 6). When more than a specific number (Maximum Viewable Streams (MVS)) of MDDS windows are displayed, then when subsequent new MDDS connections are made, the oldest MDDS connection is dropped.

In another operational mode (AutoCanvasMode) there is a virtual canvas (Canvas) that exists within the software on the Display Computer 120, that may be much larger than the physical display region 112 on the Common Display 110. Any section of the Canvas can be viewed on the display region 112. Suppose that at first the entire Canvas is viewed on the display region 112. Then by zooming into regions, a portion of the Canvas can be viewed. By pinching, zooming and panning with gestures on the touch sensor 116, a user can zoom into various regions of the Canvas to be shown on the display region 112.

The Canvas is a virtual region that expands to greater than the physical area of the display region of the Common Display, e.g., any number of times the physical area up to infinite. The use of the Canvas allows additional files to be accessible and can be saved, but off the display region. Further discussion of the canvas may be found in U.S. patent application Ser. No. 14/540,946, which is hereby incorporated by reference in its entirety for all purposes. Gestures, such as pan, zoom and pinch gestures can be made to move and resize the scale of the Canvas, allowing the full canvas to be display at once or only a small section thereof. The system can be configured so that the MDW can be moved and manipulated. For example, if the Common Display 110 includes the touch sensor 116, then touch gestures such as pan, zoom and pinch may be used to move and/or resize the MDWs. Snapshots of the MDWs can be taken from the Common Display, with the use of touch gestures. Annotations could be performed on the MDWs. Further details may be found, e.g., in U.S. patent application Ser. No. 14/540, 946.

In the Standard Mode, if a Canvas is used, and a user drags an MDI in to the display region 112 of the Common Display 110, then at this point, the user can zoom the MDDS window or can zoom the Canvas to make the MDDS window to fill most of the display region 112. Then if the user pans the Canvas, so that the MDDS window is off-screen, then the MDDS will not be visible on the display region 112.

In AutoCanvasMode, when the first MD is connected, the MDW may be automatically placed onto the center of the Canvas and the Canvas may be automatically zoomed in such that the MDW fills most of the display region 112. If MVS is set to 1, then when a second MDDS is connected, the second MDW may be automatically placed onto an empty section of the canvas (typically next to the first MDW) and the Canvas may be automatically panned and zoomed to view only the second MDW. To see both MDWs side by side, the user can pinch, zoom and pan the Canvas and/or the MDW. As in the AutoMode, the MDW may be sized to the same aspect ratio of the MDDS (or the MD screen). Alternatively, if the MVS is set to 4, then 4 MDWs at a time may be automatically displayed at one time, with each occupying approximately ¼ of the viewable Canvas on the display region 112. When more than the MVS number of MDWs are displayed, then when subsequent new MDDS connections are made, the oldest MDDS connection is not dropped, but the Canvas is just moved so that the oldest MDW is out of the viewable area of the Canvas on the display region 112.

Figure 5:
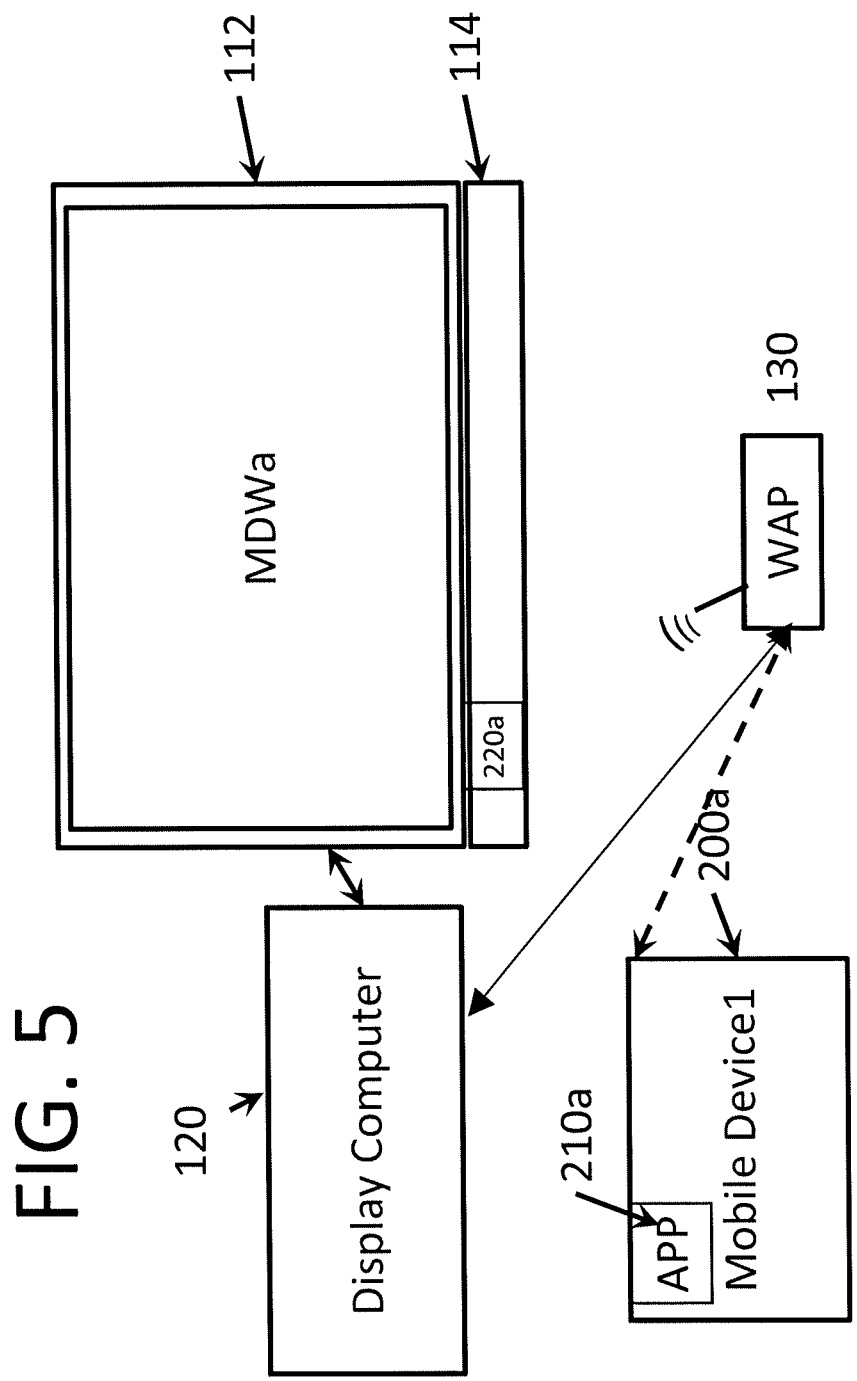
FIGS. 5 to 9 illustrate block diagrams of a display system interacting with mobile device(s) in accordance with embodiments.

As shown in FIGS. 4 and 5, a screen of the mobile device 220a may be displayed in an MDWa in the display 120. When the common display 110 and the mobile device each have a similar aspect ratio, the MDWa displaying the screen of the mobile device 200a may fill up the display region 116.

Figure 6:
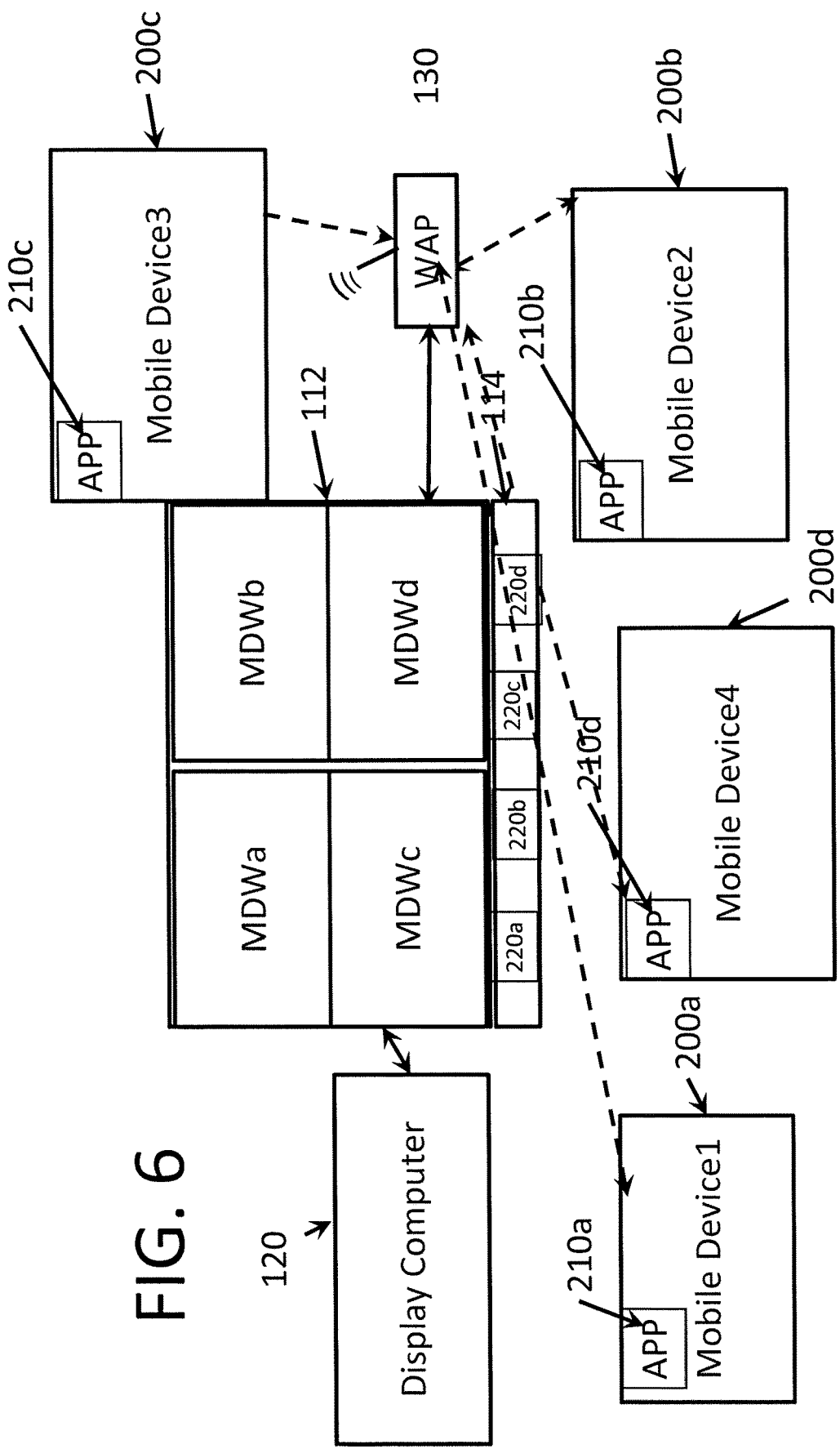
Figure 7:
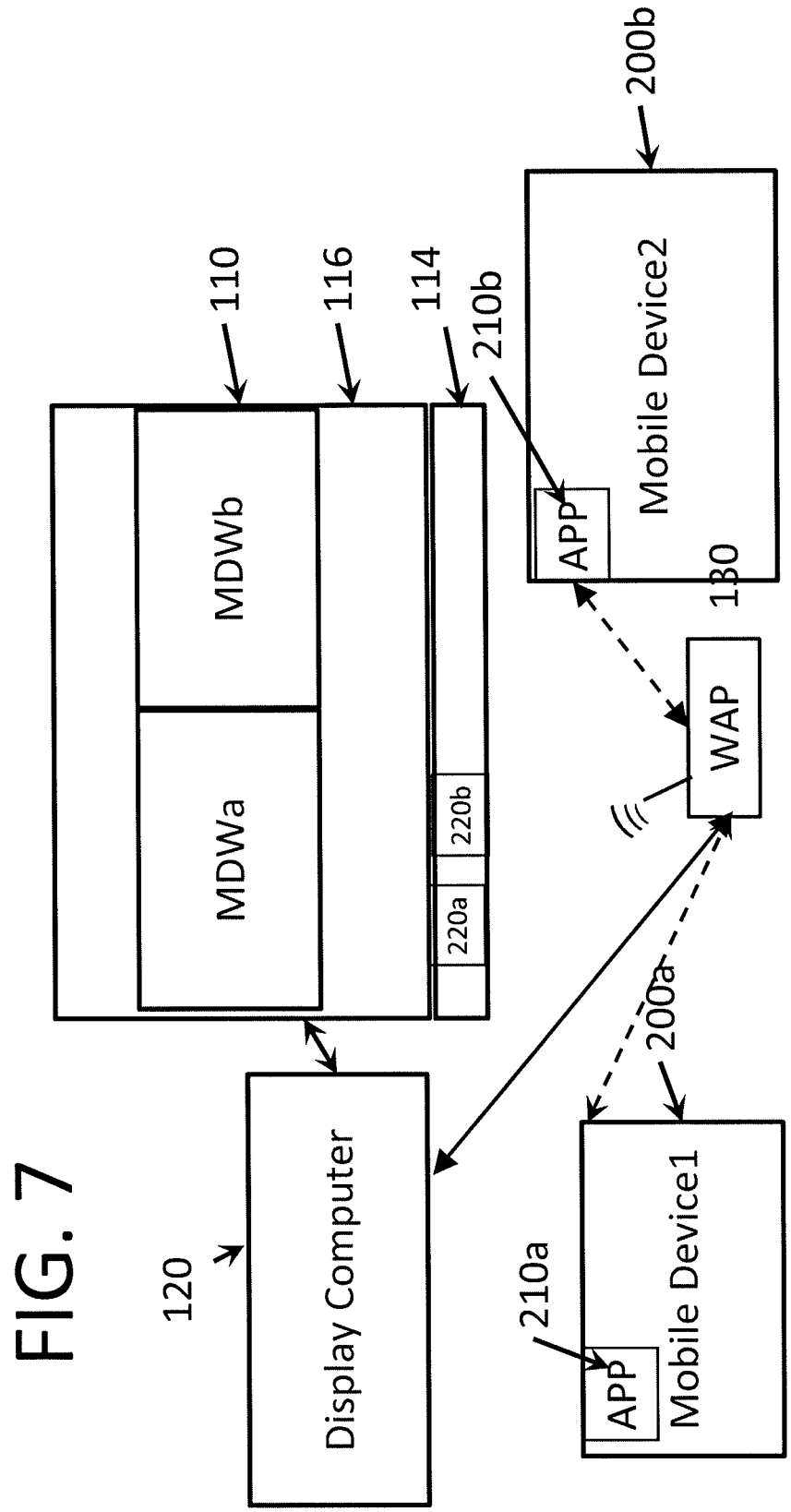

When four mobile devices 200a to 200d having similar aspect ratios as the display region 112 are connected, then the MDWa to MDWd showing contents of each of these devices can also fill the screen, as shown in FIG. 6. However, when a different number of mobile devices or devices having different aspect ratios are to have MDWs displayed on the common display 110, and these are to be as large as possible, then there will be a lot of dead space above and below the mobile device contents, as shown in FIG. 7.

Figure 8:
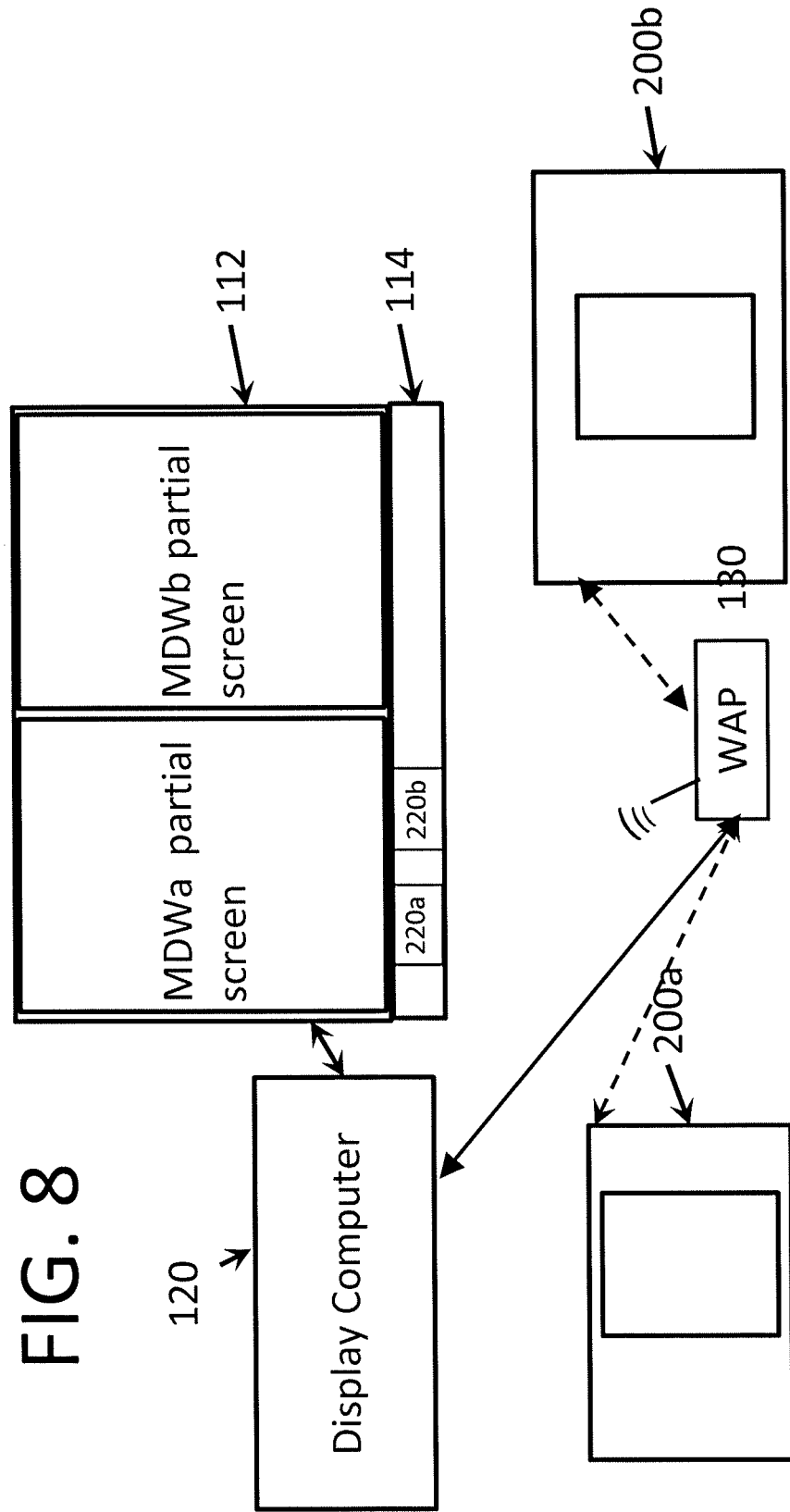

However, by only sending partial screens of each mobile device 200a, 200b, contents of multiple mobile devices 200a, 200b may be displayed in MDWa, MDWb on the display region 110 in a manner that fills up the entire display region 112, as shown in FIG. 8. For example, suppose there are two mobile devices 200a, 200b, each operated by different user. User 1 could send half of the screen on the mobile device 200a and User 2 could send half of the screen 200b to the common display 110, such that the ratio of the video signal needed for each user would then be, e.g., 8:9, rather than 16:9. These signals would be sent to the display computer 120, which can then combine these two signals on the display region 112 to fill the display region 112. Implementations to realize the partial screen display are discussed in detail below.

The MDDS from multiple devices may be displayed in individual MDWs on the display 112. When they are editable windows, each MDW may be moved, expanded and or resized, for example through the use of touch or other gestures. As the size of an MDW on the common display 110 changes, different resolutions may be used within the MDW. When the MDW covers the entirety of the common display 120, a full resolution, e.g., 1920×1080 resolution may be used. When the MDW covers only ¼ of the screen, as shown in FIG. 6, the stream resolution may be reduced, e.g., 960×540 pixels, and if the user zooms the window smaller the stream resolution may be further reduced, e.g., 480×270 pixels. Thus, in accordance with a size of the MDW or reduced resolution on the common display 110 determined in operation 70, the display computer 112 may instruct the mobile device 200a, 200b to down sample the information to be transmitted to the common display 110, in operation 75. This down sampling (Dynamic Resolution Scaling (DRS)) may increase the speed of the system and reduce network congestion. Also in the case that a MDDS window is moved off of the viewable Canvas, the Display Computer 120 may instruct the MD to only send the resolution and frame rate (e.g., 160×90 pixels @ 1 frame per 2 seconds) needed to render the MDI in the tray 114, since this will be the only visible representation of the MDDS.

For example, the Display Computer 120 may determine, in operation 70, a first resolution (R1) of the data stream sent by the MD to the Display Computer 120 and whether a region, e.g., the tray region 114 or an MDW in the display region 112, in which the data stream is to be presented and a second resolution (R2) associated with that region is different than the first resolution R1. When R2 is less than R1, the Display Computer 120 may request, in operation 75, a third resolution (R3) to the device, where R1>R3>=R2, and the AirConnect™ App on the mobile device is to down sample the selection in accordance with the resolution, R3, and only transmitting the down sampled resolution (R3) to the Display Computer 120

Additionally, in DRS mode when the MDW is expanded on the touchscreen 116, the Display Computer 120 may at first expand the content to fill the MDW, even though sufficient resolution cannot be displayed. At the same time, the Display Computer 120 may request, in operation 75, the MD through the AirConnect™ App to transmit the MDDS at a higher resolution. The net result will be that as the MDW is expanded it will first appear slightly blurry as it expands and then, as the higher resolution MDDS is received, it will fill in the MDW to show the MDDS at the resolution needed to match the MDW. Alternatively, the Display Computer 120 may request a resolution larger than needed for the MDW, but not as large as the full resolution of the display region 112, e.g., to smooth the transition to a larger image.

In contrast, in Full Resolution Mode (FRM), when a MD first connects to the display computer, it sends its MDDS at the full resolution of the MD. FRM is described, e.g., in U.S. patent application Ser. No. 14/540,946, in which the full resolution of the MDDS is stored on the display computer and down sampled to the size needed for the MDW. Then as the MDW is expanded the downsampling is reduced. While the FRM may allow resolution can be quickly changed as the window is expanded, FRM may slow down the system, when multiple MDDS are simultaneously being transmitted.

Partial screen display may be implemented using a touchscreen. Each user could send their full contents of their mobile devices to the display computer 120. The display computer 120 could send both signals to the common display 110. Then, if the common display 110 is a touchscreen, a user could use the touchscreen to select a portion of each mobile device signal to be displayed on the common display 110. For example, the user could select with the use of a window drawn on the common display 110, the left half of each of the two signals displayed. Once selected the unselected portions (e.g. the right half) of each signal would not be displayed. At this point the display computer 120 could expand the contents of the selected regions to fill the common display 110 or the user could expand the contents therein through the use of gestures.

Yet another option is to select the portion of their mobile device to be sent to the common display 110 using the mobile device. Only this selected portion would then be sent to the display computer 120. Selection on the mobile device may be realized by either framing a window on the mobile device or selecting a third party application running on the mobile device and sending only the contents of this third party application to the display computer 120, reducing the information transmitted to the display computer 120. Other options to select a portion of the mobile device include: set options, e.g. send left half or right half of screen, ⅓ or other fractions, and have dividers placed on screen so that users can move documents in to fill up frames displayed. This may also increase the speed of the system.

Figure 9:
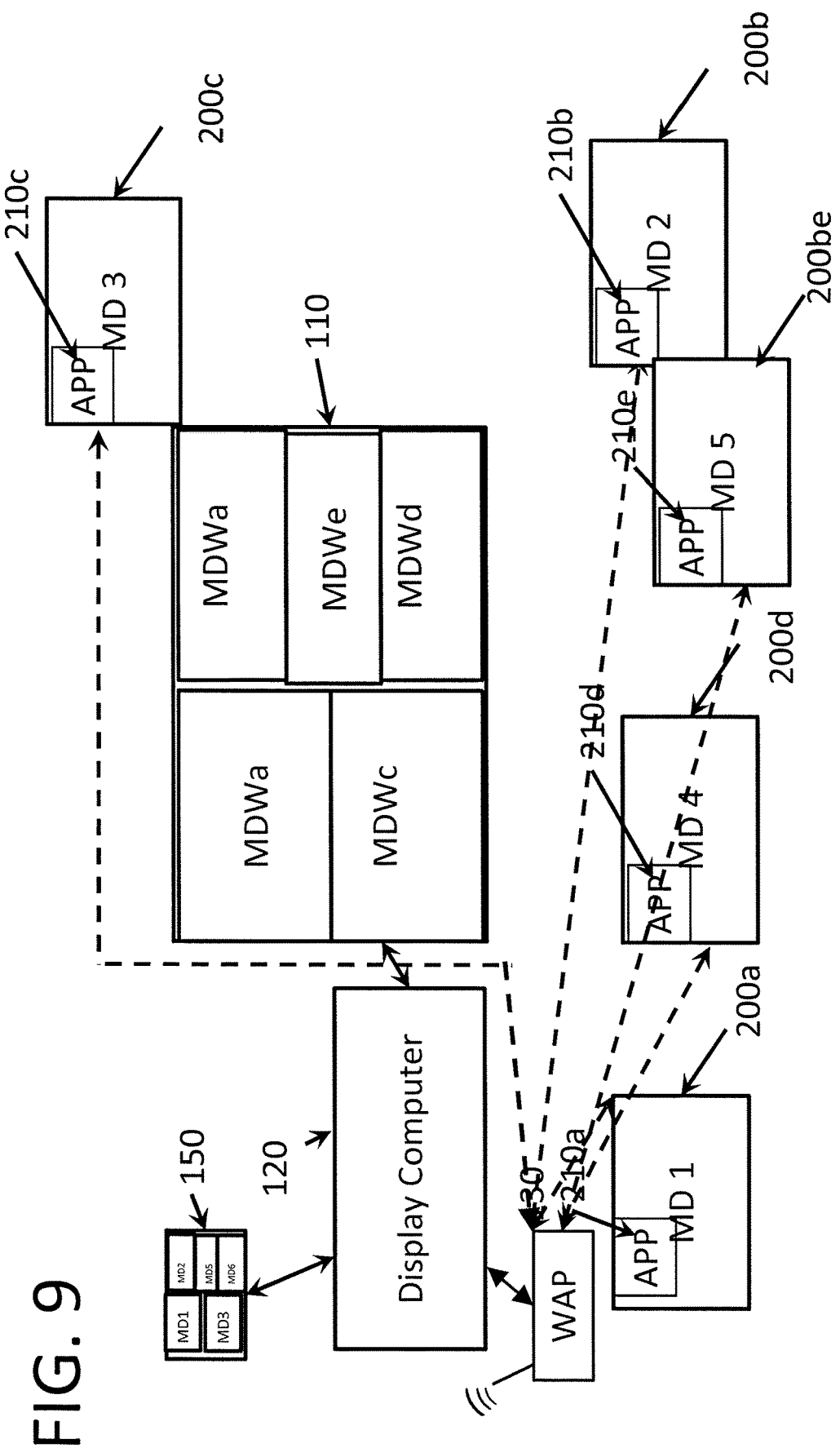

Another option is to do the same if a touch sensor is associated with the common display 110, but does not overlay the common display 110. For example, a smaller touchscreen display 150, e.g., in table, having a similar aspect ratio as the common display 110 and a touch sensor, may be used to control the common display 110, as shown in FIG. 9. The connected mobile device contents could be displayed on this small touch screen. Suppose five mobile devices 200a to 200e are connected wirelessly to the display computer 120. All of these devices could then be displayed on the small touch screen 150, e.g., each in a window with a 16×9 ratio, to be referred to as a "user proto-window." A user could select individual user proto-windows to be displayed on the common display 110 and may then select portions of each of these user proto-windows. These user proto-windows could be rearranged on the small touchscreen display 150 by moving them around, expanding and contracting them to fill the small touchscreen display 150, including selecting and removing portions of each and arrange them in a way to fill the small touchscreen display 150 and then mirror the entire touchscreen display 150 on to the common display 110.

Actions performed on the display region 116 (or the touchscreen display 150) may be transmitted back to the corresponding mobile device. For example, when a user connects with the AirConnect™ App, a special MDI may appear in the primary display region, that denotes that items can be dragged to this MDI (File Transfer Mode (FTM)). Alternatively, a special outline or graphic could be added to the MDW for a MD device that would denote that items can be dragged to the MDW, or in other words that FTM is activated for the corresponding MD. For example, an image or a group of pdfs or jpegs on the display region of the common display 110 could then be dragged to the Mobile Device Icon or the MDW to send these files to the mobile device 220a. For example, if the MDW has FTM activated and an image is dragged to the MDW, then the Display Computer would send the file for the image to the MD through the AirConnect App. The AirConnect App may display a question on the MD asking the user if the file transfer is to be allowed.

File Transfer from MD to Common Display—Initiated from Common Display

Similarly, files may also be dragged from an MDW or an MDI to the Canvas. For example, if FTM is activated on an MDW or an MDI, then by performing a gesture or tapping or selecting a graphic on the MDW, a File Structure Window (FSW) may be superimposed on or near the MDW on the Common Display, displaying icon representations of each file and folders that the AirConnect™ App has access to. The user of the MD may give the AirConnect™ App access to their entire hard drive or to only files that they place in certain folders. Once the FSW is displayed on the Common Display, then a user may drag the file icon from the FSW on to the Common Display. This will then the cause the Display Computer to signal the MD through the AirConnect App for the AirConnect App to send a copy of the file to the Display Computer. Once received, the Display Computer can then display the file on the Common Display. For example, if the file is a pdf, then the icon of the pdf would be displayed in the FSW. Once dragged to the Common Display and the pdf is received by the Display Computer, the Display Computer could then display the pdf with the first page of the pdf initially visible. By performing touch gestures on this first page, the other pages can then be displayed, since the Display Computer has the entire file.

Note that with this FTM, a user can go to a touch screen, select a file from a MDW, drag it off of the MDW on to the Common Display, then edit the file on the Common Display (e.g., annotate) and then drag it back to the MDW to send the edited file back to the MD.

Whether the full mobile device MD window is still in view on the Common Display 110 may be determined in operation 80. If not, the display computer 120 may request that the mobile device MD just stream the thumbnail data in operation 85. If yes, then the streaming may proceed unaltered.

Such changes in the display region 116 of the common display 110 may be determined any time a change is made on the image of the associated mobile device or may only be determined when a user indicates the image is to be updated on the mobile device, e.g., drags the changed image back to the drags the image back to the tray region 114. Once a change is determined in operation 80, the display computer 120 may stream the changed data back to the corresponding mobile device.

If operation 90 determined a mobile device is moved further than a predetermined distance from the common display 110 and is still connected thereto, a warning may be sent to the mobile device alerting the mobile device that it is about to be disconnected in operation 92. Such a warning may be audible, visible, and/or tactile. If a user selects to stay connected in operation 94, the connection may be maintained. If the user selects to disconnect in operation 94, the session may end in operation 96 and the mobile device is disconnected and disappears from the display portion 116 and the tray 114.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of connecting a mobile device to a common display associated with a display computer controlling the common display, including, for each mobile device:
   downloading a display application onto the mobile device;
   selecting the display computer for the common display in the display application;
   connecting the mobile device to the display computer;
   selecting, on the mobile device, what is to be displayed on the common display; and
   sending a data stream of the selection on the mobile device to the display computer to be displayed in a region on the common display corresponding to the mobile device, wherein the display computer is to:
      determine a first resolution (R1) of the data stream sent by the mobile device to the display computer,
      determine a second resolution (R2) associated with the region in which the data stream is to be presented, and
   when R2 is less than R1, then sending a third resolution (R3) to the mobile device, where R1>R3>=R2, and
   the display application on the mobile device is to
      down sample the data stream of the selection on the mobile device in accordance with the third resolution, R3, provided by the display computer and
      only transmitting the down sampled resolution (R3) from the mobile device to the display computer, and
   when the second resolution (R2) of the region in which the data stream is presented changes to an updated second resolution (R2), the display computer is to send an updated third resolution (R3) to the mobile device, and the mobile device is to transmit the data stream to the display computer in accordance with the updated third resolution (R3)

the display computer is further to:
- display the data stream from the mobile device in a mobile device window on common display, the mobile device window being an editable window can be moved, resized, and marked on; and
- when a user marks on the mobile device window on the common display and then performs a predetermined action on the common display that selects one of the mobile devices, data associated with the mark is transmitted to the corresponding mobile device.

2. The method as claimed in claim 1, wherein an entirety of the mobile display is selected to be sent to the common display and the region is a window with a second resolution R2 that is less than the first resolution R1.

3. The method as claimed in claim 1, wherein an entirety of the mobile display is selected to be sent to the common display and the region is a window with the second resolution R2 equal to the first resolution R1.

4. The method as claimed in claim 1, wherein the region is a tray region outside a display region of the common display where windows are displayed.

5. The method as claimed in claim 1, wherein an entirety of the mobile display is selected to be sent to the common display and the region is a window, the common display is a touch screen display and the user selecting only a portion of the window to be displayed by performing a touch tap or gesture on the common display.

6. The method as claimed in claim 1, wherein an entirety of the mobile display is selected to be sent to the common display, the entirety of the mobile display to be displayed in a window on a touchscreen display, separate from the common display, the user selecting only a portion of the window on the touchscreen display to be displayed in the region on the common display.

7. The method as claimed in claim 1, wherein selecting what is to be displayed on the common display includes selecting only a portion of a screen on the mobile device.

8. The method as claimed in claim 1, further comprising automatically displaying the selection in the mobile device window.

9. The method as claimed in claim 1, further comprising displaying a device icon in a tray region outside a display region of the common display where mobile device windows are displayed.

10. The method as claimed in claim 9, further comprising displaying the selection in a corresponding mobile device window when the device icon is moved toward the display region on the common display.

11. The method as claimed in claim 10, wherein, when the corresponding mobile device window is moved toward the device icon, the display computer transmits the file represented in the corresponding mobile device window to the corresponding mobile device.

12. The method as claimed in claim 1, wherein selecting includes automatically connecting to the common display closest to the mobile device.

13. The method as claimed in claim 1, wherein, when a size of the region on the common display is changed such that the second resolution R2 changes, the display computer sends the changed second resolution R2 to the mobile device and the mobile device transmits the data stream to the display computer with in accordance with the changed second resolution.

14. The method as claimed in claim 1, wherein, when the region is moved off a viewable canvas on the common display, the display computer instructs the mobile device to send only information to display an icon of the mobile device.

15. A method of connecting a mobile device to a common display associated with a display computer controlling the common display, including, for each mobile device:
- downloading a display application onto the mobile device;
- selecting the display computer for the common display in the display application;
- connecting the mobile device to the display computer;
- selecting, on the mobile device, only a portion of the mobile device to be displayed on the common display;
- sending a live continuous video stream of the portion of the mobile device to the display computer to be displayed in a window on the common display corresponding to the mobile device, the window for the portion of the mobile device occupying a display region of the common display,
- determining, by the display computer, a size of the window and a resolution associated the window for the portion of the mobile device;
- sending the resolution from the display computer to the mobile device;
- down sampling, by the mobile device, the portion of the mobile device in accordance with the resolution from the display computer and only transmitting the down sampled resolution from the mobile device to the display computer, wherein, when a size of the window on the common display is changed such that the resolution associated therewith changes, the display computer sends the changed resolution to the mobile device and the mobile device transmits the video stream to the display computer with in accordance with the changed resolution;
- displaying the data stream from the mobile device in the window on common display, the window being an editable window can be moved, resized, and marked on; and
- when a user marks on the editable window on the common display and then performs a predetermined action on the common display that selects one of the mobile devices, transmitting data associated with the mark to the corresponding mobile device.

16. The method as claimed in claim 15, further comprising:
- connecting another mobile device to the common display; and
- selecting, on the other mobile device, only a portion of the mobile device to be displayed on the common display, wherein windows for the mobile device and the other mobile device occupy the display region of the common display.

17. The method as claimed in claim 15, wherein, when the region is moved off a viewable canvas on the common display, the display computer instructs the mobile device to send only information to display an icon of the mobile device.

* * * * *